United States Patent
Koenig et al.

(10) Patent No.: US 8,608,823 B2
(45) Date of Patent: Dec. 17, 2013

(54) APPARATUS AND PROCESS FOR GRANULATING A METAL MELT

(75) Inventors: Veit Koenig, Rodenbach (DE); Andreas Huber, Geiselbach (DE); Bernd Amend, Steinau (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 294 days.

(21) Appl. No.: 13/127,201

(22) PCT Filed: Oct. 29, 2009

(86) PCT No.: PCT/EP2009/007734
§ 371 (c)(1),
(2), (4) Date: May 2, 2011

(87) PCT Pub. No.: WO2010/051936
PCT Pub. Date: May 14, 2010

(65) Prior Publication Data
US 2011/0209577 A1    Sep. 1, 2011

(30) Foreign Application Priority Data
Nov. 4, 2008   (EP) ..................................... 08168273

(51) Int. Cl.
*B22F 9/08*    (2006.01)
(52) U.S. Cl.
USPC .............. 75/337; 75/341; 266/202; 137/809; 137/810; 137/592; 137/605
(58) Field of Classification Search
None
See application file for complete search history.

(56) References Cited

U.S. PATENT DOCUMENTS

| 3,888,956 A | 6/1975 | Klint |
| 4,192,673 A | 3/1980 | Baba et al. |
| 5,258,053 A | 11/1993 | Forwald et al. |
| 5,328,574 A * | 7/1994 | Mercier ........................ 205/744 |
| 6,773,487 B2 | 8/2004 | Vanhoutte et al. |

FOREIGN PATENT DOCUMENTS

| DE | 4417100 | 11/1994 |
| EP | 0 522 844 | 1/1993 |
| GB | 125238 | 4/1919 |
| GB | 233720 | 8/1926 |

(Continued)

OTHER PUBLICATIONS

PCT Notification of Transmittal of Translation of the International Preliminary Examination Report (Form PCT/IB/338) mailed May 19, 2011 for Application No. PCT/EP2009/007734.

(Continued)

*Primary Examiner* — George Wyszomierski
(74) *Attorney, Agent, or Firm* — Smith, Gambrell & Russell, LLP

(57) ABSTRACT

The invention relates to an apparatus and a process for granulating a metal melt. The apparatus substantially comprises a round water tank, into which water is injected in a tangential direction with the aid of a number of nozzles, so that the water in the tank rotates and forms a parabolic surface. The nozzles are arranged such that they are distributed in height and around the circumference of the tank wall. The uppermost nozzle is located in the region of the surface of the water and produces a stream of water or fan of water lying in the surface of the water. For granulating a metal melt, it is poured continuously from a melting crucible into the stream of water or fan of water of the uppermost nozzle.

20 Claims, 2 Drawing Sheets

(56) References Cited

FOREIGN PATENT DOCUMENTS

| GB | 313652 | 6/1929 |
| GB | 2279368 | 1/1995 |
| JP | 60-82604 | 5/1985 |
| WO | 97/20624 | 6/1997 |
| WO | 00/16890 | 3/2000 |
| WO | 01/55462 | 8/2001 |
| WO | 03/106012 | 12/2003 |

OTHER PUBLICATIONS

PCT International Preliminary Report on Patentability (Form PCT/IB/373) issued May 10, 2011 for Application No. PCT/EP2009/007734.

English translation of the PCT Written Opinion of the International Searching Authority (Form/ISA/237) issued May 6, 2010 for Application No. PCT/EP2009/007734 (English translation).

International Search Report for PCT/EP2009/007734 mailed May 6, 2010.

* cited by examiner

APPARATUS AND PROCESS FOR GRANULATING A METAL MELT

The present invention is concerned with the granulation of a metal melt by pouring the melt into water.

Various apparatuses and processes for granulating metal melts or molten slags with water have become known. Granulation facilitates further transport and processing of the slags and metals. The granulation of a metal is advantageous particularly whenever it is intended to be processed with other metals to form an alloy. This depends on exact portioning of the metals, which is facilitated if the metals are in a granulated form.

WO 01/55462 A1 describes a process for refining impure raw silver. This involves leaching the impure raw silver with nitric acid. The leaching is carried out on granulated raw silver. For this purpose, the molten raw silver is granulated in water. The granulating operation is not described any further.

WO 03/106012 describes a process and an apparatus for granulating molten metal. The process is preferably used for granulating molten silicon. The metal melt is poured out in a continuous stream. The stream of molten metal is broken down by low-pressure gas jets into metal drops, which are cooled in flowing water and finally collected.

EP 0 522 844 A2 likewise describes a method for granulating molten metal. This is mainly concerned with a molten silicon/magnesium alloy. The molten metal can be made to fall from a launder into a water tank. The pouring stream is thereby broken down into drops, which solidify and form the granules. A substantially uniform stream of water is produced in the water tank, leaving from a side wall of the water tank perpendicularly to the pouring stream. The flow velocity in the water stream is lower than 0.1 m/s.

GB 233720 and GB 313652 describe a process for granulating molten solid substances in liquids. In this case, the liquid is either set in rotation by rotation of the tank or by a mechanical agitator, producing a vortex. The molten solid substance is broken down into droplets and flung out laterally by a rotating plate or a stream divider, which is located in the hollow of the vortex, so that the melt droplets are projected laterally into the liquid, where they sink to the bottom. The vortex makes it possible for the melt droplets to pass through a greater height of water for cooling than would be the case with an equal amount of water that is not set in rotation.

FIELD OF THE INVENTION

The present invention is concerned with the granulation of high-value precious metals such as gold, silver, platinum, palladium, rhodium and alloys of these precious metals with one another or with other metals. For understandable reasons, these metals or alloys are present only in small quantities, so that only batchwise granulation is appropriate for them, whereas the known processes for granulating slags, for example, must ensure continuous granulation of relatively large quantities of slag. In addition, it has been found in tests conducted by the inventors that vigourous vaporous eruptions and discharging of the water content of the tank often occur during the granulation of metal melts, in particular during the granulation of the aforementioned precious metals when they are poured into a tank filled with water. This is caused by the high amount of water that is stored in the metal melt and the only insufficient mixing that is obtained by mechanical agitators. One thing that has been found with conventional agitated granulating tanks is that, because of the agitator itself, which of course takes part of the surface area of the bottom of the tank, some of the surface area is not available for the distribution of the solidified, but still hot metal granulate, which has led to accumulations of metal at the periphery of the tank. It has also been found that, although rotation of the tank and conventional agitation produces a pronounced vortex, the flow velocity of the water is very low. Since, however, because of the relatively great height of the water and the required cooling of the metal melt, pouring is preferably carried out into the peripheral region of the vessel, this has repeatedly led to accumulations of the solidified, but still hot metal granulate at the periphery of the tank. Since, when the melt is being poured in, the stream of melt does not stay in one place but moves, liquid metal keeps being poured into the inner region of the vortex, where it is initially insufficiently cooled. Altogether, these factors repeatedly cause accumulations of hot metal granulate, the water between the granulate particles being heated until it vaporizes and leading to loud vaporous eruptions and discharging of the water content of the tank, sometimes together with granulate particles.

Object Of The Invention

It was therefore the object of the invention to provide an apparatus and a process with which precious metals can be granulated batchwise in relatively small quantities with little effort, without the observed vaporous eruptions occurring.

BRIEF DESCRIPTION OF THE INVENTION

This object is achieved by the apparatuses and processes defined in the claims. Preferred embodiments of the apparatus and the process are described in the corresponding subclaims and concern 1. An apparatus (1) for granulating a metal melt in water, comprising
   a round water tank (2) with a tank bottom (3), a tank wall (4), a tank inflow device (5) and a water outflow (6), attached to the tank wall at a desired height above the tank bottom (3), wherein the water inflow device (5) comprises a distributor pipe (7), which is arranged outside the water tank (2) and is connected to a first horizontally directed water nozzle (8), which is led through the tank wall from the outside, above the water outflow (6), and with which water can be injected tangentially into the water tank (2), wherein the position of the water outflow (6) on the circumference of the water tank (2) is chosen in relation to the first nozzle (8) such that the angular offset between the first nozzle (8) and the water outflow (6) is at least 90°.
2. The apparatus according to item 1, wherein the distributor pipe (7) has below the first water nozzle (8) further horizontal water nozzles (9, 10, 11, 12, 13, 14), which, distributed at various heights above the tank bottom (3), can likewise inject water from the outside tangentially into the water tank (2).
3. The apparatus according to one of the preceding items, wherein the further water nozzles (9, 10, 11, 12, 13, 14), distributed at various heights above the tank bottom (3) and along the circumference of the tank wall (4), can inject water from the outside tangentially into the water tank (2).
4. The apparatus according to one of the preceding items, wherein the further water nozzles (9, 10, 11, 12, 13, 14) are arranged such that they are distributed evenly in height between the tank bottom (3) and the first water nozzle (8).
5. The apparatus according to one of the preceding items, wherein the further water nozzles (9, 10, 11, 12, 13, 14) are arranged such that they are distributed at equal intervals around the circumference, beginning with the circumferential position of the first water nozzle (8).

6. The apparatus according to one of the preceding items, wherein there are 2 to 10 further water nozzles in addition to the first water nozzle (8).
7. The apparatus according to one of the preceding items, wherein the further water nozzles (9, 10, 11, 12, 13, 14) are arranged such that they are offset at equal intervals from one another around the circumference, by in each case 5 degrees to 45 degrees, advantageously 10 degrees to 35 degrees, in particular 15 degrees to 25 degrees.
8. The apparatus according to one of the preceding items, wherein the first nozzle (8) is located in the region of the surface of the water and produces a stream of water or a fan of water in the surface of the water.
9. The apparatus according to one of the preceding items, wherein the second nozzle (9) is arranged perpendicularly below the first nozzle (8).
10. The apparatus according to one of the preceding items, wherein the nozzle openings of the water nozzles (8, 9, 10, 11, 12, 13, 14) are formed by oval openings or slits with a longitudinal extent, which can feed water to the water tank (2) in the form of wide fans.
11. The apparatus according to one of the preceding items, wherein the angle formed by the longitudinal extent of the opening of the first nozzle (8) and the tank wall is approximately 90° to approximately 135°, in particular approximately 100° to approximately 110°.
12. The apparatus according to one of the preceding items, wherein the opening of the first nozzle (8) is arranged such that the fan of water produced is directed approximately parallel to a parabolic surface of water rotating in the water tank (2) at the position of the first nozzle, while the openings of the further nozzles (9, 10, 11, 12, 13, 14) are directed with their longitudinal extent parallel to the tank wall (4).
13. The apparatus according to one of the preceding items, wherein each nozzle is assigned a valve (18) between the nozzle opening and the distributor pipe (7) for setting the mass throughflow of water.
14. The apparatus according to one of the preceding items, wherein the water can be made to circulate for granulating a metal melt, in that the water outflow (6) of the water tank (2) is connected by way of a return line (17) to an intake port of a water pump (18), the discharge port of which supplies the water inflow device (5) with water by way of a flow line (19).
15. The apparatus according to one of the preceding items, wherein the water outflow (6) is arranged at at least half the height, advantageously in the upper half of the height, in particular in the upper third of the height, between the bottom (3) of the water tank and the surface of the water in the switched-off state.
16. The apparatus according to one of the preceding items, wherein the water is sucked away and cooled before it is fed back to the water tank.
17. A process for granulating a metal melt in an apparatus according to one of the preceding items, characterized
in that the round water tank (2) is filled with water and the water in the tank is set in rotation, in that a partial quantity of the water is circulated and is injected tangentially into the water tank with the aid of at least one water nozzle (8), distributed in height and around the circumference of the water tank, wherein the rotating water assumes a parabolically shaped surface (16) and the at least one nozzle (8) is fastened to the tank wall such that it feeds the water to the water tank in a wide fan close to the parabolic surface (16) and wherein the metal melt is poured from a melting crucible in an uninterrupted stream into the water fan formed by the first water nozzle, until the melting crucible has been emptied.
18. The process according to item 17, wherein the mass of water used for the process is approximately 5 to 50 times as great as the mass of metal melt in the melting crucible that is to be granulated.
19. The process according to one of the preceding items, wherein the circulated partial quantity of water is set such that the total amount of water in the water tank (2) is completely circulated once every 0.5 to 5 minutes or so.
20. The process according to one of the preceding items, wherein the outflow velocity of the water from the first nozzle (8) is 0.5 to 5 m/s.
21. The process according to one of the preceding items, wherein the temperature of the water before the beginning of granulation lies between 10 and 30° C.
22. The use of an apparatus according to one of the preceding items for granulating precious metals.

DETAILED DESCRIPTION OF THE INVENTION

The apparatus (1) for granulating a metal melt in water comprises a round water tank (2) with a tank bottom (3), a tank wall (4), a tank inflow device (5) and a water outflow (6), attached to the tank wall at a desired height above the tank bottom (3), wherein the water inflow device (5) comprises a distributor pipe (7), which is arranged outside the water tank (2) and is connected to a first horizontally directed water nozzle (8), which is led through the tank wall from the outside, above the water outflow (6), and with which water can be injected tangentially into the water tank (2). The position of the water outflow (6) on the circumference of the water tank (2) is chosen in relation to the first nozzle (8) such that the angular offset between the first nozzle (8) and the water outflow (6) is at least 90°, preferably more than 180°.

During operation, the tank is filled with water, which is set in rotation by the tangential injection of water and the surface of which therefore forms a paraboloid of revolution. For granulation, the molten metal is poured out of a melting crucible into the cone of water or fan of water formed by the first nozzle. The paraboloid of revolution produced is in this case generally less pronounced than the vortex in apparatuses with mechanical agitation, so that reliable breaking up of the stream and distribution of the granules produced is ensured even when the stream of molten metal undergoes movement. The first nozzle (8) is located in the region of the surface of the water and produces a stream of water or fan of water lying in the surface of the water.

The distributor pipe (7) preferably has below the first water nozzle further horizontal water nozzles (9, 10, 11, 12, 13, 14), which are arranged at various heights above the tank bottom (3) and can likewise inject the water from the outside tangentially into the water tank (2). These additional nozzles help to set the water in the water tank in rotation and make it possible to influence the vertical velocity profile in addition to the radial velocity profile of the rotating water.

The further water nozzles (9, 10, 11, 12, 13, 14) may be distributed irregularly between the tank bottom and the first water nozzle (8). However, good results are also achieved with a regular distribution of the water nozzles. In addition, it has proven to be advantageous not to arrange all the water nozzles (9, 10, 11, 12, 13, 14) vertically one under the other, but to distribute them around the circumference of the water tank, preferably at equal intervals, beginning with the circumferential position of the first water nozzle (8). In this case, the lower nozzle in each case is offset forwards in the direction of rotation of the water. The purpose of this measure is to impart a sufficiently high horizontal impulse to the granules formed in the water, so that when they sink down in the tank they are transported into the injecting region of the next-lower nozzle, wherein the formation of the parabolically shaped surface of the water or a vortex is minimized. As a result, the granules are quickly distributed over a large volume of water. This reduces the risk of the formation of vaporous eruptions. The optimum circumferential offset between two neighbouring nozzles depends substantially on the metal itself and the rotational velocity of the water and is preferably determined by trials. The circumferential offset between the nozzles is usually 5 degrees to 45 degrees, advantageously 10 degrees to 35 degrees, in particular 15 degrees to 25 degrees. In this case, it is advantageous still to arrange the second nozzle (9) perpendicularly below the first nozzle (8), in order to obtain a sufficient initial horizontal acceleration of the sinking granules. A sufficient angular offset between the first nozzle (8) and the water outflow (6) ensures that the granulated metal cannot get into the water outflow. As further protection from metal losses, the water outflow (6) may also be covered by a screen. Experience with the granulating apparatus has shown that the angular offset between the first nozzle and the water outflow should be at least 90°. Preferably, an angular offset of more than 180° is used.

The number of further water nozzles (9, 10, 11, 12, 13, 14) may be adapted to the desired granulating result. Good results have been achieved with 2 to 10, in particular 6, further water nozzles.

In a specific embodiment of the invention, six water nozzles (9, 10, 11, 12, 13, 14) are distributed with a constant circumferential offset at equal intervals, beginning with the circumferential position of the first water nozzle (8), in which the lower nozzle in each case is offset forwards in the direction of rotation of the water by 10 degrees to 25 degrees (in particular 17 degrees to 22 degrees) and the first water nozzle (8) is arranged without any circumferential offset perpendicularly above the second nozzle (9), wherein the angular offset between the first nozzle and the water outflow is more than 180°.

The nozzles directed tangentially in the water tank are connected to the distributor pipe (7) by way of pipelines which are led from the distributor pipe along the outer circumference of the water tank to the respective circumferential position of the water nozzles, where they are led through the tank wall.

The nozzles may be formed by the pipelines themselves, and consequently have a circular nozzle opening corresponding to the cross section of the pipelines. Preferably, however, the nozzle openings are configured as oval openings or as slit openings with a longitudinal extent, which feed the water to the water tank in the form of wide fans. Preferably, the opening of the first nozzle (8) is arranged such that the fan of water produced is directed approximately parallel to the parabolic surface of the water at the position of the first nozzle. For this purpose, the opening of the first nozzle (8) is formed as an oval or in the form of a slit and is directed such that the longitudinal extent of the opening of the first nozzle (8) is directed approximately perpendicularly to the tank wall, that is to say the angle formed by the longitudinal extent of the opening of the first nozzle (8) and the tank wall may preferably be approximately 90° to approximately 135°, in particular approximately 100° to approximately 110°. By contrast with this, the openings of the further nozzles (8, 9, 10, 11, 12, 13, 14) are preferably directed with their longitudinal extent parallel to the tank wall.

For setting the vertical velocity profile, it is advantageous to assign each nozzle (8, 9, 10, 11, 12, 13, 14) a valve (18) between the nozzle opening and the distributor pipe (7) for setting the mass throughflow of water.

The water supply to the water tank is preferably configured as a circulating system. For this purpose, the water outflow (6) of the water tank may be connected by way of a return line (17) to the intake port of a water pump (18), the discharge port of which supplies the water inflow device (5) with water by way of a flow line (19), and consequently closes the circuit. According to the invention, the water outflow (6) is not attached to the bottom of the water tank but is raised up from the bottom (3) of the tank, advantageously to at least half the height between the bottom (3) of the water tank and the surface of the water in the switched-off state, in particular in the upper half of the height between the bottom (3) of the water tank and the surface of the water in the switched-off state. In a particularly advantageous embodiment, the water outflow (6) is in the upper third of the height between the bottom (3) of the water tank and the surface of the water in the switched-off state. The arrangement of the water outflow (6) close to the surface of the water ensures that the water that is warmed up the most is sucked away. As described above, the water supplied to the water tank is advantageously configured as a circulating system, wherein the water heated up the most is sucked away and, particularly advantageously, cooled before it is fed back to the water tank. This may take place by passive cooling or active cooling, that is to say supplying a cooling medium such as gas or a cooling fluid. For cooling, the water to be cooled is advantageously passed through a heat exchanger.

Usually, however, it is sufficient to make the return line (17) and the flow line (19), which connect the water pump (18) to the water tank (2), longer and to cool these lines or tubes passively, that is to say allow heat exchange with the surroundings.

In a further specific refinement of the invention, six water nozzles (9, 10, 11, 12, 13, 14) are distributed with a constant circumferential offset at equal intervals, beginning with the circumferential position of the first water nozzle (8), in which the lower nozzle in each case is offset forwards in the direction of rotation of the water by 10 degrees to 25 degrees (in particular 17 degrees to 22 degrees) and the first water nozzle (8) is arranged without any circumferential offset perpendicularly above the second nozzle (9), wherein the angular offset between the first nozzle and the water outflow (6) is more than 180° and the water outflow (6) is in the upper third of the height between the bottom (3) of the water tank and the surface of the water in the switched-off state. This specific refinement of the invention is most particularly advantageous if the return line (17) and the flow line (19), which connect the water pump (18) to the water tank (2), are made longer and these lines or tubes are passively cooled, that is to say that heat exchange with the surroundings is possible.

The quality of the water used should correspond to drinking water, as provided as tap water by water supply companies. Otherwise, the water does not have to meet any special requirements.

With the apparatus described, precious metals can be granulated in small batches of 10 to 50 kg. For this purpose, the water tank (2) is first filled with water. The first nozzle (8) is located in the region of the surface of the water and is intended to produce a stream of water or a fan of water lying in the surface of the water. Then, the water in the tank is set in rotation, in that a partial quantity of the water is circulated and is injected tangentially into the water tank (2) with the aid of a pump (18) and at least one water nozzle (8), wherein the surface of the rotating water in the tank assumes the form of a paraboloid of revolution (16). By appropriately regulating the amount of water supplied, the rotational velocity of the water can be set such that the water level (15) at the tank wall rises more or less to the position of the first nozzle (8) and the amount of water fed by the first nozzle is injected in the form of a fan parallel to the parabolic surface. The circumferential velocity of the water in the vicinity of the tank wall is typically approximately 0.5 to 10 m/s. The molten metal is then poured into the fan of water of the first nozzle in a continuous stream by tipping the melting crucible, until the melting crucible has been emptied. The pouring velocity preferably lies in the range between 10 and 30 kg/min. It should be ensured here that, as far as possible, the stream of melt always impinges on the fan of water of the first nozzle (8) at the same place. This preferably takes place as close as possible to the tank wall (4). The temperature of the melt should lie 100 to 300° C. above the melting temperature of the metal.

Preferably, the water is not injected into the water tank with just one nozzle but with a number of nozzles (8, 9, 10, 11, 12, 13, 14), which are arranged such that they are distributed in height and around the circumference of the water tank.

The water should have a temperature between 10 and 30° C. before beginning of the granulation. The mass of water used for the process is preferably about 5 to 50 times the mass of metal melt to be granulated in the melting crucible. This mass ratio ensures that the water is not excessively heated up by the heat released by the metal to the water. The circulated partial quantity of water should be set such that the total amount of water is completely circulated once every 0.5 to 5 minutes or so.

Once the entire metal melt has been poured out, the water circulation is stopped, the water in the tank is let out or pumped away and the metal granulate formed is removed from the tank.

With the process described, it is possible to granulate said precious metals reliably and at low cost. The grain distribution of the granulate can be adapted to the requirements of its application within wide limits. This takes place by choosing the pouring velocity for the metal melt, the rotational velocity of the water in the tank and, in particular, the velocity with which the water is fed to the tank by the first nozzle. With a high velocity of the fed water, substantially compact, almost spherical, granules with grain sizes of between approximately 0.5 and 5 mm are obtained, well-suited for metering in the production of alloys. With a lower velocity, on the other hand, the process produces large granules with a fissured surface, which are advantageous if, for example, they are intended to be further treated by leaching processes. Preferably, the outlet velocity of the water from the first nozzle (8) is between 5 and 15 m/s, depending on the desired granulating result.

DESCRIPTION OF THE DRAWINGS

The invention is explained in more detail below with the aid of FIGS. 1 to 4, in which:

FIG. 1 shows an apparatus (1) for the granulation of 1 to 50 kg of precious metal. The water tank (2) may have a useful water capacity of approximately 350 kg. The water tank (2) is equipped with a water inflow device (5), which comprises a distributor pipe (7), which is arranged perpendicularly outside the water tank (2) and supplies water to the nozzles (not shown here), which are led through the tank wall (4) from the outside and can inject water tangentially into the water tank (2). Arranged below a first water nozzle (8) is a water outflow (6), to make continuous circulation of the water possible. The water inflow and the water outflow each comprise a valve for regulating the amount of throughflow.

FIG. 2 shows a view of the granulating apparatus (1) from above into the water tank (2). The pipelines for supplying the nozzles (8, 9, 10, 11, 12, 13 and 14) with water are led horizontally around the water tank outside the water tank. At the desired points around the circumference, the pipelines are led through the tank wall (4) and enter the nozzles arranged tangentially in relation to the tank wall.

FIG. 3 shows a perpendicular section through the apparatus (1) in the direction A-A of FIG. 2. FIG. 3 shows the formation of the parabolic water surface (16) during the operation of the apparatus. The periphery (15) of this water surface at the tank wall is set by the velocity of the water inflow such that it reaches approximately up to the uppermost nozzle (8) or rises up slightly above that. The further nozzles are arranged at various heights below the first nozzle, in order to be able to set the vertical velocity profile of the rotating water.

FIG. 4 shows a schematic representation of the already described water circulation of the granulating apparatus with the aid of the water pump (18), the intake port of which is connected by way of the water line (17) to the water outflow (6) of the water tank (2) and the discharge port of which supplies the water inflow (5) of the water tank with water by way of the water line (19).

EXAMPLE

Figure 1:
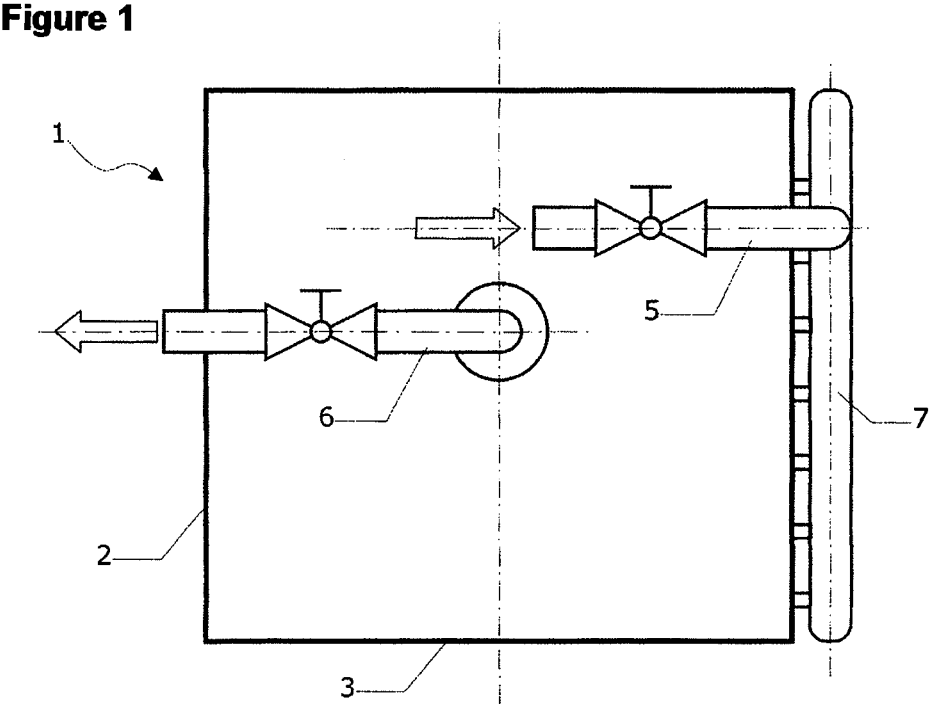
FIG. 1 shows a side view of the apparatus for granulating a metal melt with the water inflow and the water outflow as well as the distributor pipe
Figure 2:
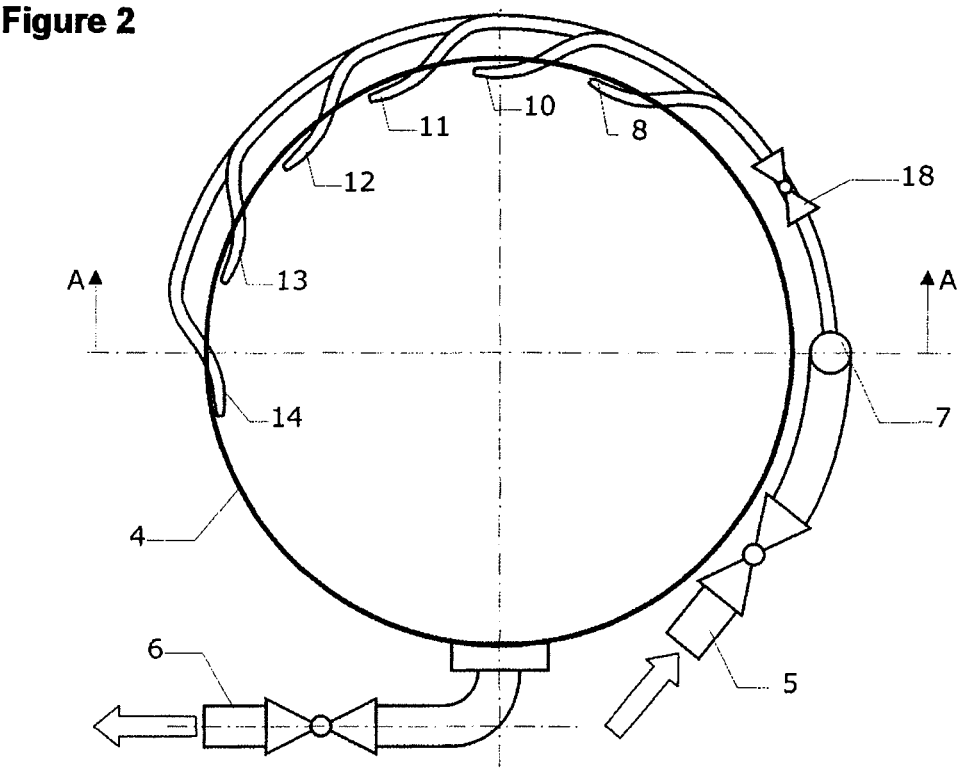
FIG. 2 shows a view from above into the water tank with the arrangement of the water nozzles around the circumference of the water tank
Figure 3:
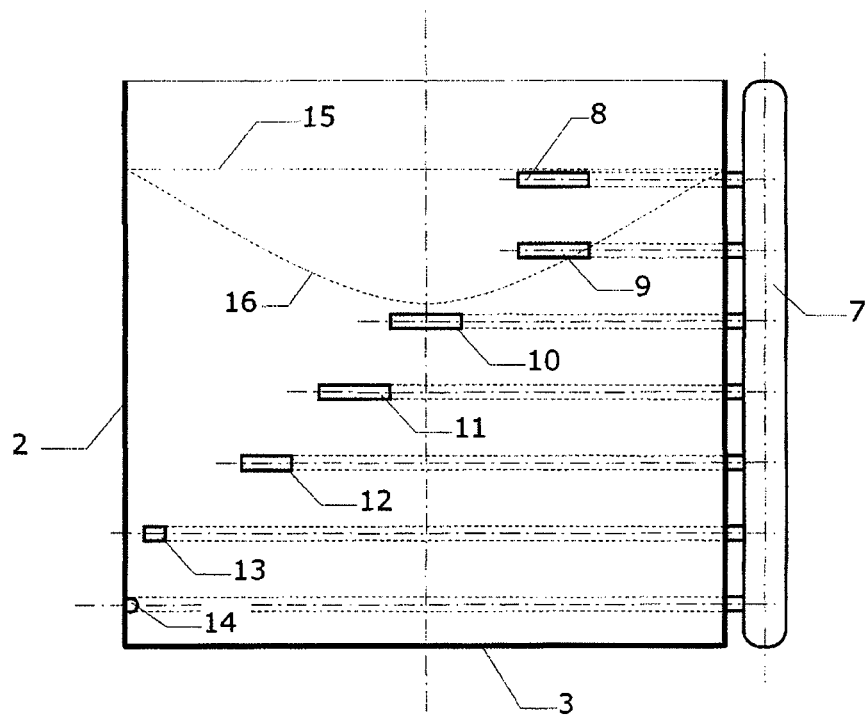
FIG. 3 shows a sectional view A-A through the water tank with the vertical arrangement of the water nozzles
Figure 4:
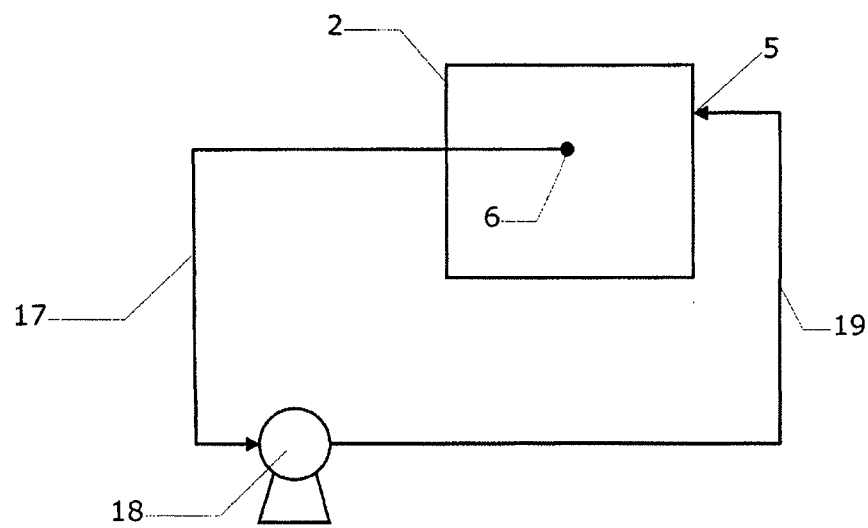
FIG. 4 shows a schematic representation of the water circulation of the granulating apparatus.

For the granulation of 25 kg of platinum, a water tank was fabricated from high-grade steel with a diameter of 85 cm and a height of 80 cm. As shown in FIG. 3, the tank was equipped with an uppermost water nozzle (8) and 6 further water nozzles. The further water nozzles were offset in relation to one another in the direction of rotation of the water from top to bottom by in each case 20 angular degrees.

The water tank was filled with 300 litres of tap water at a temperature of 10° C. By switching on the pump (18) with a delivery rate of 50 m$^3$/h, the water was set in rotation until the upper periphery of the water at the tank wall had risen up to the height of the first nozzle (8). Then, the molten platinum, heated to 2000° C., was poured at a rate of 20 kg/min into the fan of water produced by the first water nozzle (8). The granulation proceeded unproblematically without any vaporous eruptions. Once pouring in had been completed, the water was pumped away and the platinum granulate was removed from the tank.

Comparative Example

For the granulation of 25 kg of platinum, a water tank was fabricated from high-grade steel with a diameter of 85 cm and a height of 80 cm. The water tank was agitated by a mechanical agitator, which protruded into the water tank from above on a shaft and the agitating element of which was fastened to the lower end of the shaft and driven by an external motor. As shown in FIG. 3, the tank was equipped with an uppermost water nozzle (8). No further water nozzles were present.

The water tank was filled with 300 litres of tap water at a temperature of 10° C. By switching on the agitator, the water was agitated and set in rotation until the upper periphery of the water at the tank wall had risen up to the height of the first nozzle (8) and the pump (18) was switched on. This created a pronounced vortex. Then, the molten platinum, heated to 2000° C., was poured in at a rate of 20 kg/min into the fan of water produced by the first water nozzle (8) and broken up by it. During the circulating agitation, accumulations of platinum granulate kept occurring at the bottom of the water tank near the pouring-in point. Loud vaporous eruptions repeatedly occurred, with water and platinum metal being flung out of the water tank. Once pouring in had been completed, the water was pumped away and the platinum granulate was removed from the tank.

The invention claimed is:

1. An apparatus for granulating a metal melt in water, comprising
   a round water tank with a tank bottom, a tank wall, a tank inflow device and a water outflow, the tank inflow device and water outflow being attached to the tank wall at a height above the tank bottom, wherein
   the tank inflow device comprises a distributor pipe which is arranged outside the water tank and is connected to a first horizontally directed water nozzle,
   the first nozzle being led through the tank wall from the outside, at a height above the water outflow, and configured to inject water into the water tank tangentially to the tank wall,
   the water outflow is positioned on the circumference of the water tank such that the angular offset between the first nozzle and the water outflow is at least 90°, and
   the distributor pipe includes a plurality of horizontal water nozzles distributed at various heights below the first water nozzle and above the tank bottom, the plurality of nozzles being configured to inject water into the water tank tangentially to the tank wall.

2. The apparatus according to claim 1, wherein the plurality of water nozzles extend horizontally along the circumference of the tank wall.

3. The apparatus according to claim 2, wherein the plurality of water nozzles are arranged such that they are distributed at equal intervals around the circumference.

4. The apparatus according to claim 3, wherein there are 2 to 10 water nozzles in the plurality of water nozzles, in addition to the first water nozzle.

5. The apparatus according to claim 3, wherein the plurality of water nozzles are arranged such that they are offset at equal intervals from one another around the circumference of the water tank, by in each case 5 degrees to 45 degrees.

6. The apparatus according to claim 5, wherein the plurality of water nozzles are arranged such that they are offset at equal intervals from one another around the circumference of the water tank, by in each case 10 degrees to 35 degrees.

7. The apparatus according to claim 6, wherein the plurality of water nozzles are arranged such that they are offset at equal intervals from one another around the circumference of the water tank, by in each case 15 degrees to 25 degrees.

8. The apparatus according to claim 1, wherein a second nozzle is arranged below the first nozzle, and on a common vertical axis with the first nozzle.

9. The apparatus according to claim 1, wherein nozzle openings of the water nozzles are formed by oval openings or slits with a longitudinal extent, and are configured to feed water to the water tank in the form of fans.

10. The apparatus according to claim 9, wherein the nozzle openings of the water nozzles are formed with a longitudinal extent, and an angle formed by the longitudinal extent of the opening of the first nozzle and the tank wall is approximately 90° to approximately 135°.

11. The apparatus according to claim 10, wherein the nozzle openings of the water nozzles are formed with a longitudinal extent, and an angle formed by the longitudinal extent of the opening of the first nozzle and the tank wall is approximately 100° to approximately 110°.

12. The apparatus according to claim 9, wherein the opening of the first nozzle is configured to produce a fan of water that is directed approximately parallel to a parabolic surface of water rotating in the water tank at the position of the first nozzle, while the openings of the plurality of nozzles are formed with longitudinal extents that are directed parallel to the tank wall.

13. The apparatus according to claim 1, further comprising a circulating system for circulating water for granulating a metal melt, wherein the water outflow of the water tank is connected by way of a return line to an intake port of a water pump, and a discharge port of the water pump supplies the tank inflow device with water by way of a flow line.

14. The apparatus according to claim 13, wherein the water outflow is arranged at a height that is at least half the height between the bottom of the water tank and a height at which the surface of water in the water tank rests when the apparatus is in a switched-off state.

15. The apparatus according to claim 13, wherein the circulating system is configured to suck water away from the water tank, and cool the water, before feeding the water back to the water tank.

16. The apparatus according to claim 14, wherein the water outflow is arranged at a height that is in the upper half of the water tank height.

17. The apparatus according to claim 16, wherein the water outflow is arranged at a height that is in the upper third of the water tank height.

18. A process for granulating a metal melt including
    pouring a metal melt into the water tank of the apparatus according to claim 1, wherein
    the round water tank is filled with water and the water in the tank is set in rotation, in that a partial quantity of the water is circulated and is injected into the water tank tangentially to the tank wall with the aid of at least one water nozzle, arranged at a height on and extending around the circumference of the water tank,
    the rotating water assumes a parabolically shaped surface and the at least one nozzle is fastened to the tank wall such that it feeds the water to the water tank in a form of a fan close to the parabolic surface and
    the metal melt is poured in an uninterrupted stream into the water fan formed by the first water nozzle.

19. The process according to claim 18, wherein the mass of water used for the process is approximately 5 to 50 times as great as the mass of metal melt to be granulated.

20. A process for granulating a precious metal melt including,
    pouring a metal melt into the water tank of the apparatus according to claim 1.

* * * * *